US012694081B2

(12) United States Patent
Freeman

(10) Patent No.: US 12,694,081 B2
(45) Date of Patent: Jul. 28, 2026

(54) SYSTEM AND METHOD FOR CREATING A CLOUD-BASED AT-HOME RECORDING STUDIO

(71) Applicant: Adam Freeman, Los Angeles, CA (US)

(72) Inventor: Adam Freeman, Los Angeles, CA (US)

( * ) Notice: Subject to any disclaimer, the term of this patent is extended or adjusted under 35 U.S.C. 154(b) by 243 days.

(21) Appl. No.: 18/370,994

(22) Filed: Sep. 21, 2023

(65) Prior Publication Data

US 2024/0104175 A1 Mar. 28, 2024

Related U.S. Application Data

(60) Provisional application No. 63/409,758, filed on Sep. 24, 2022.

(51) Int. Cl.
| | |
|---|---|
| *G06F 21/31* | (2013.01) |
| *G06F 9/455* | (2018.01) |
| *G10H 1/00* | (2006.01) |
| *H04L 65/401* | (2022.01) |

(52) U.S. Cl.
CPC .......... *G06F 21/31* (2013.01); *G06F 9/45558* (2013.01); *G10H 1/0008* (2013.01); *G10H 1/0033* (2013.01); *H04L 65/401* (2022.05); *G06F 2009/45583* (2013.01); *G06F 2009/45595* (2013.01); *G10H 2240/101* (2013.01); *G10H 2240/175* (2013.01)

(58) Field of Classification Search
CPC ... G06F 21/31; G06F 9/45558; H04L 65/401; G10H 1/0008; G10H 1/0033
See application file for complete search history.

(56) References Cited

U.S. PATENT DOCUMENTS

| | | | | |
|---|---|---|---|---|
| 10,171,375 | B2 * | 1/2019 | Ruan | H04L 41/0897 |
| 11,709,891 | B2 * | 7/2023 | Al-Omari | G06N 20/00 |
| | | | | 707/718 |
| 12,463,836 | B2 * | 11/2025 | Vosseller | H04L 9/3213 |
| 2014/0115587 | A1 * | 4/2014 | Qin | H04L 41/0672 |
| | | | | 718/1 |

(Continued)

OTHER PUBLICATIONS

Ida Stahlnacke, "Soundtrap Launches 'Soundtrap Capture,' New Music App for Collaborative, On-the-Go Recording", Business Wire, pp. 1-5 (Year: 2020).*

(Continued)

*Primary Examiner* — Clayton R Williams

(57) ABSTRACT

A cloud-based recording studio infrastructure includes a remote recording studio system including a cloud computing module configured to instantiate a virtual machine instance associated with a user and dynamically provision computing resources to the virtual machine instance associated with the user, the virtual machine instance associated with the user being configured as a music production environment, a cloud storage module configured to manage a cloud storage network, store an uploaded file from the user to the cloud storage network, and restrict access to one or more resources stored on the cloud storage network to the virtual machine instance associated with the user, and a connection manager module configured to authenticate the user and manage access to the virtual machine instance associated with the user.

16 Claims, 4 Drawing Sheets

(56) References Cited

U.S. PATENT DOCUMENTS

2015/0149906 A1* 5/2015 Toff .................... G11B 27/031
715/723

OTHER PUBLICATIONS

Diane Powers "BandLab welcomes users by the millions with AWS", Aws for M&E Blog, pp. 1-3 (Year: 2020).*
Yifat Perry, "S3 Access for Objects With Different Permissions in an S3 Bucket", NetApp, pp. 1-11 (Year: 2022).*

* cited by examiner

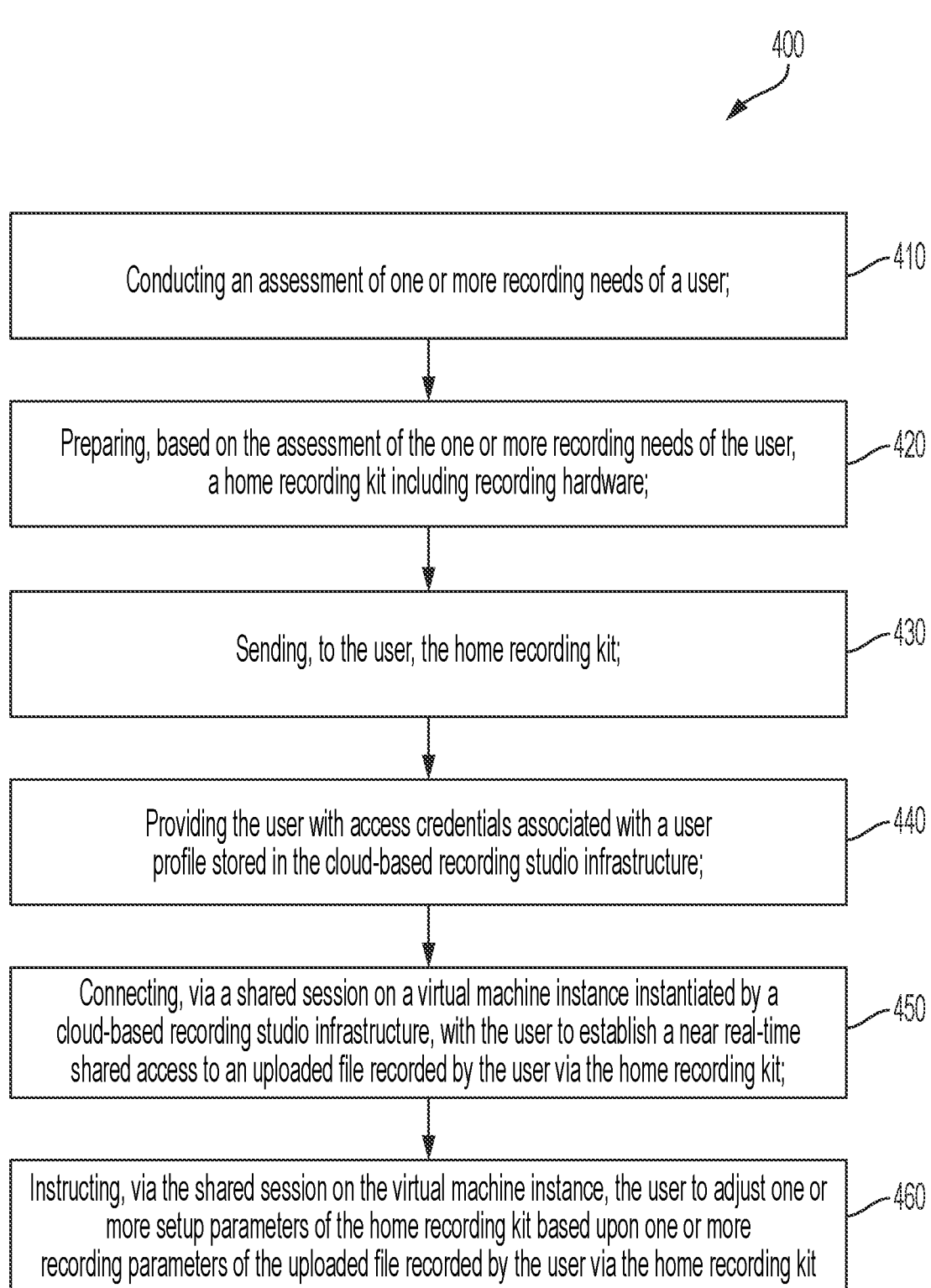

400

410
Conducting an assessment of one or more recording needs of a user;

420
Preparing, based on the assessment of the one or more recording needs of the user, a home recording kit including recording hardware;

430
Sending, to the user, the home recording kit;

440
Providing the user with access credentials associated with a user profile stored in the cloud-based recording studio infrastructure;

450
Connecting, via a shared session on a virtual machine instance instantiated by a cloud-based recording studio infrastructure, with the user to establish a near real-time shared access to an uploaded file recorded by the user via the home recording kit;

460
Instructing, via the shared session on the virtual machine instance, the user to adjust one or more setup parameters of the home recording kit based upon one or more recording parameters of the uploaded file recorded by the user via the home recording kit

FIG. 4

SYSTEM AND METHOD FOR CREATING A CLOUD-BASED AT-HOME RECORDING STUDIO

CROSS REFERENCE TO RELATED APPLICATION

This application claims the benefit of U.S. Provisional Application Ser. No. 63/409,758, filed Sep. 24, 2022, the entirety of which is incorporated by reference herein.

BACKGROUND OF THE INVENTION

Technical Field

Aspects of embodiments of the present disclosure are directed to systems and methods for creating a cloud-based at-home recording studio. More specifically, aspects of some embodiments of the present disclosure are directed to a cloud-computing and storage infrastructure configured to integrate with pre-configured hardware kits for creating at-home recording studio systems and to corresponding methods for installation/operation thereof.

Problems that are to be Solved by the Invention

The demand for significant computing resources to power professional-level DAW software may have created a significant barrier to access to professional-level DAWS for aspiring amateur musicians. Many musicians may not be able to afford to purchase and/or maintain computing systems that are sufficiently powerful. Likewise, purchasing licenses to access DAW software and other audio-editing tools may significantly increase these costs. Therefore, there is a need for a system that may reduce these barriers to access by reducing the costs and simplifying the creation of at-home recording studios by offering pre-configured recording hardware that can be integrated into a cloud computing and storage system to alleviate the need for consumers to purchase powerful computers to run professional-level DAWs.

Means for Solving the Problem

Aspects of some embodiments of the present disclosure are directed to systems, and corresponding methods, for creating at-home recording studios that integrate pre-configured recording hardware kits into a cloud-computing and storage infrastructure that may allow a user to access professional-level DAWs and other audio-editing tools without having to own powerful computing systems at home.

Effect of the Invention

Aspects of some embodiments of the present disclosure may provide a user with a simplified process for installing an at-home recording studio that can leverage cloud-based resources to give the user access to professional-level DAW software and processing without the need for buying expensive at-home computing systems. Moreover, in some embodiments, the user may be able to request assistance from recording professionals to assist or instruct them with audio editing/mixing in real time via a shared access to the cloud computing resources.

SUMMARY OF THE INVENTION

One or more embodiments of the present disclosure are directed to systems and methods for creating a cloud-based at-home recording studio.

A cloud-based recording studio infrastructure, includes a host sever network configured to store and execute a set of instructions, the set of instructions being configured to, when executed, cause the host server network to instantiate a remote recording studio system having a cloud computing module configured to instantiate a virtual machine instance associated with a user and dynamically provision computing resources to the virtual machine instance associated with the user, the virtual machine instance associated with the user being configured as a music production environment; a cloud storage module configured to manage a cloud storage network, store an uploaded file from the user to the cloud storage network, and restrict access to one or more resources stored on the cloud storage network to the virtual machine instance associated with the user; and a connection manager module configured to authenticate the user and manage access to the virtual machine instance associated with the user.

The cloud-based recording studio infrastructure may have the connection manager module be further configured to authenticate a recording professional and manage access by the recording professional to the virtual machine instance associated with the user.

The cloud-based recording studio infrastructure may have the connection manager module be further configured to manage simultaneous access by the user and the recording professional to the virtual machine instance associated with the user.

The cloud-based recording studio infrastructure may have the remote recording studio system further include a collaboration module configured to provide a near real-time audio connection between the user and the recording professional alongside the simultaneous access by the user and the recording professional to the virtual machine instance associated with the user.

The cloud-based recording studio infrastructure may have the cloud storage module be further configured to associate the uploaded file from the user with the user and restrict further access to the uploaded file from the user to only the virtual machine instance associated with the user.

The cloud-based recording studio infrastructure may have the host server network include a plurality of solid-state drives (SSDs), a memory, a processing unit, and a plurality of multi-core graphics processing units (GPUs).

The cloud-based recording studio infrastructure may have the music production environment be configured to run one or more digital audio workstations (DAWs).

The cloud-based recording studio infrastructure may have the music production environment be further configured to run one or more video editing programs alongside the one or more DAWs.

The cloud-based recording studio infrastructure may have the cloud computing module be configured to dynamically provision computing resources to the virtual machine instance associated with the user according to a file-size parameter and a file-number parameter being operated on within the music production environment to maintain an expected-response-time parameter for the music production environment at or below a predetermined threshold value.

The cloud-based recording studio infrastructure may have the remote recording studio system further include a tokenization module configured to associate a user-associated file with a unique digital identifier stored in a record on a blockchain. A method for installation of a cloud-based home recording studio includes conducting an assessment of one or more recording needs of a user, preparing, based on the assessment of the one or more recording needs of the user, a home recording kit including recording hardware, sending, to the user, the home recording kit, connecting, via a shared session on a virtual machine instance instantiated by a cloud-based recording studio infrastructure, with the user to establish a near real-time shared access to an uploaded file recorded by the user via the home recording kit, instructing, via the shared session on the virtual machine instance, the user to adjust one or more setup parameters of the home recording kit based upon one or more recording parameters of the uploaded file recorded by the user via the home recording kit.

The method for installation of a cloud-based home recording studio may further include providing the user with access credentials associated with a user profile stored in the cloud-based recording studio infrastructure.

The method for installation of a cloud-based home recording studio may have the one or more setup parameters include a distance between a microphone and a vocal isolation booth included in the home recording kit.

The method for installation of a cloud-based home recording studio may have the one or more recording parameters include a measure of reverb distortion contained within the uploaded file.

A cloud-based music production system includes a first remote computing device configured with an audio capture program, a microphone configured to communicatively connect to the first remote recording device, a cloud storage network configured to be accessible to the first remote computing device, a cloud-based recording studio infrastructure configured to instantiate a virtual machine instance running a digital audio workstation and further configured to allow remote access to the virtual machine instance to the first remote computing device.

The cloud-based music production system may have the cloud-based recording studio infrastructure be further configured to store one or more session files recording a state of the virtual machine instance to the cloud storage network automatically upon a termination event of the virtual machine instance.

The cloud-based music production system may have the cloud-based recording studio infrastructure be further configured to load the one or more session files from the cloud storage network and instantiate the virtual machine instance at the previously recorded state of the virtual machine instance.

The cloud-based music production system may further include a second remote computing device configured to remotely access the virtual machine instance.

The cloud-based music production system may further include a headphone configured to communicatively connect to the first remote computing device.

The cloud-based music production system may have the cloud-based recording studio infrastructure be further configured to dynamically provision one or more cloud resources to the virtual machine instance and record a resource usage metric for the virtual machine instance to the cloud storage network.

BRIEF DESCRIPTION

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 4 is a flowchart describing a method for the creation of a home-based remote recording studio, according to aspects of embodiments of the present disclosure.

DETAILED DESCRIPTION

Figure 1:
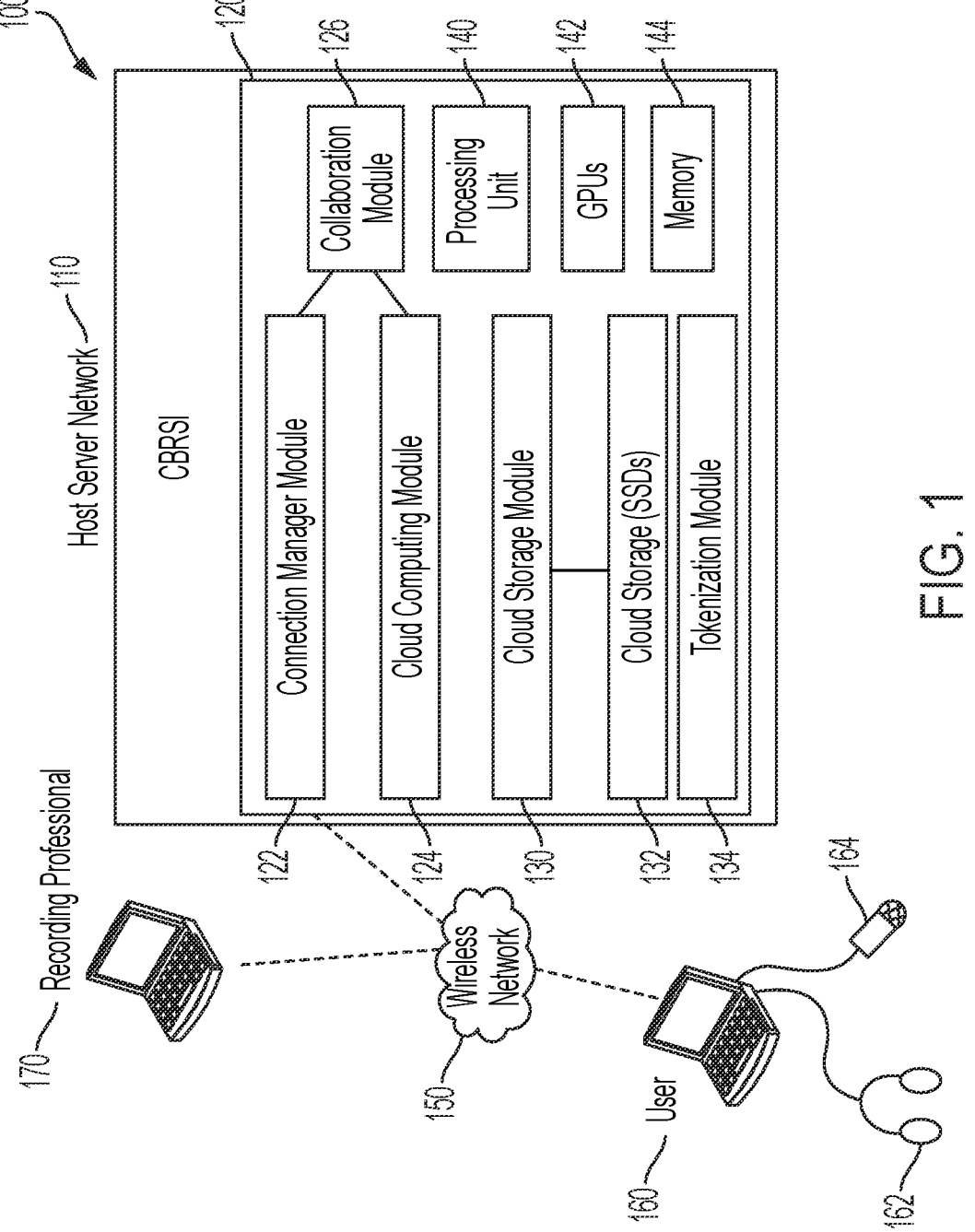
FIG. 1 is a diagram depicting a user device and a recording professional device connected over a wireless network to a cloud-based recording studio infrastructure, according to aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to"

another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration. The term "simultaneous" is used herein to describe access by more than one user/recording professional to an embodiment of the present disclosure at the same time with both users/recording professionals having independent control. The term "concurrent" is used to describe access by more than one user/recording professional to an embodiment of the present disclosure wherein one user/recording professional has active control over the embodiment while the remaining users/recording professionals are observers.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present disclosure will now be described. As described previously, aspects of embodiments of the present disclosure are directed to systems and methods for creating a cloud-based at-home recording studio. Some of these systems and methods may include pre-configured kits of recording hardware that may be installed by a user and then integrated into a cloud-based computing infrastructure. For simplicity, some embodiments of the pre-configured kits of recording hardware (hereinafter, "Kits") will be described first, and disclosures regarding some embodiments of the cloud-based computing infrastructure will be provided second. Finally, some non-limiting workflows enabled by some embodiments of the integrated system and methods for creating a cloud-based at-home recording studio will be described.

Pre-Configured Kits

As described above, music production often requires the recording of audio from live instruments or vocalists. Generally speaking, this may involve the use of one or more microphones and at least one analog-to-digital converter (ADC) to capture analog audio and convert it into a digital recording that can later be processed using a computer. As will be appreciated by one skilled in the art, there is a tremendous variety of recording components and techniques for capturing quality recordings of live audio that typically go beyond the experience level and budget of aspiring musicians. To help alleviate some of these issues, some aspects of the present disclosure are directed to pre-configured kits ("Kits") of recording equipment that be installed by a user to quickly setup an at-home recording studio.

As a non-limiting example, some embodiments of the Kits of the present disclosure may include a USB microphone, a set of headphones, and a vocal isolation booth. The USB microphone may, in some embodiments, allow for the recording of a wide range of instruments and/or vocalists while requiring only a USB connection to a computing device, such as a computer, tablet, or laptop. In some other embodiments, the USB microphone may have a built-in ADC.

A set of headphones may be included in some embodiments of the Kits to help provide a consistent listening experience for users when they evaluate their recordings. As will be appreciated by one skilled in the art, one of the difficulties in producing high quality music or audio is that listeners may hear the recordings on various different sets of speakers or headphones and each of these may produce different levels of fidelity in reproducing the audio. Providing a standardized headphone in a Kit may, in some embodiments, eliminate some variability between users, and in some instances recording professionals accessing the recordings, when listening to audio recorded using the Kits. This may, in some embodiments, help to create a more consistent final product and streamline music production as the response/fidelity of the headphones may be considered when evaluating recordings.

In yet other embodiments of the Kits, a vocal isolation booth may be provided. For many at-home music producers, capturing a clear vocal recording may be challenging. The inclusion of the vocal isolation booth may, in some embodiments, help to simplify the recording of vocal audio for at-home users by reducing the unwanted noise and reverb associated with recording in a non-isolated environment.

In some embodiments, the Kits may be pre-configured to include some or all of the above-identified component pieces of recording hardware. In some other embodiments, additional recording hardware as may be known to be useful to one skilled in the art may be supplied as well. However, one potential benefit of some embodiments of the pre-configured Kits is that the user may be provided with a standardized set of recording equipment that may require reduced setup time and may be connected to nearly any computer or laptop to which a user may have access. As will be described in more detail below, some aspects of embodiments of the present disclosure are directed to allowing a user to get access to professional-level DAW software without having to own expensive computing resources, and the use of the pre-configured Kits may in some embodiments allow for a user to connect his or her at-home recording equipment up to the cloud-computing resources of the present disclosure using a low cost or already owned computing device running only a pre-installed or freely available entry-level DAW program. Cloud-Based Recording Studio Infrastructure After a user has captured an audio recording, the music production process may, in some use cases, turn to editing and mixing the recorded audio with other audio recordings to create a complete song. This part of the music production process is typically performed using a DAW that allows users to arrange, correct, and mix multiple audio recordings using a graphical user interface. Like most software products, there are a range of DAWs on the market that offer varying levels of features and workflow tools that typically become more expensive as the quality of the software increases. Moreover, as described above, while entry-level DAWs have become common as pre-installed or freely available software for consumers, professional-level DAWS may have significant costs and are typically run using computing systems with significant processing power and memory in order to function properly. Likewise, professional-level DAWs frequently provide extensive toolsets and workflow options that can create a daunting learning curve for new users.

Aspects of some embodiments of the present disclosure are thus directed at a cloud-based recording studio infrastructure that can provide a user, or a recording professional, with remote access to a user's audio recordings within a virtual production environment configured with professional-level DAWs and powered by cloud-computing resources that may reduce the demands of the computing device operated by a user at home and provide access to real-time supervision/instruction for aspiring music producers wanting to learn on professional-level tools.

As will be appreciated by one skilled in the art, the cloud-based recording studio infrastructure (hereinafter, "CBRSI") may, in some embodiments, include multiple software modules that work in concert to provide a user or recording professional with a remotely accessible virtual system capable of professional-level DAW operation. Some of these software modules are described below to enhance the completeness of the present disclosure.

Turning now to FIG. 1, a diagram depicting an embodiment of a cloud-based recording studio infrastructure ("CBRSI") 100, according to some aspects of the present disclosure, in communication with a user 160 and a recording professional 170 is shown. Hereinafter, the term "user 160" may be used to describe either an operator of one or more embodiments of the present disclosure or a remote computing device operated by said operator. Likewise, the term "recording professional 170" may be used to describe either a professional operator of one or more embodiments of the present disclosure or a remote computing device operated by said professional operator.

As will be appreciated by one skilled in the art, the CBRSI 100 may, in some embodiments, include a set of instructions stored on, and executed by, a host server network 110 to instantiate or otherwise make available a remote recording studio system 120 when the instructions are executed by the host server network 110. Any suitable programming language or languages may be used to program the instructions, and different component portions of the instructions may be programmed in different programming languages.

Likewise, as will be appreciated by one skilled in the art, the physical components, i.e., hardware, of the host server network 110 may include any components and configurations of components as are known to be suitable for this purpose. As a non-limiting example, the host server network 110 may include a plurality of solid-state drives (SSDs) configured to operate as cloud storage 132, a memory 144, a processing unit 140, and a plurality of multi-core graphics processing units (GPUs) 142. In some embodiments, solid-state drives (SSDs) configured to operate as cloud storage 132 may be exclusively used as storage within the host server network 110 to improve overall speed for handling/loading content stored within the host server network 110. In some other embodiments, any combination of SSDs and any other storage medium known to be suitable for short-term and long-term storage of digital media may be used.

In still other embodiments, the plurality of multi-core GPUs 142 may be used within the host server network 110 to process data-intensive operations by increasing the number of operations that can be performed in parallel. As will be appreciated by one skilled in the art, the instructions for handling/executing operations in parallel and the number of GPU cores and/or threads may be varied to meet specific system needs or performance parameters. As such, all combinations of multi-core GPUs 142 and instructions for parallel processing of data-intensive operations known to be suitable for the purpose of audio/video editing are within the scope of the present disclosure.

I. Connection Manager Module

As seen in FIG. 1, some embodiments, the CBRSI of the present disclosure may include a connection manager module 122. The connection manager module 122 may, in some other embodiments, provide an application programming interface (API) to facilitate communication between the CBRSI 120 and a user. In still other embodiments, the connection manager module 122 may create a persistent connection between a virtual machine running a production environment on the CBRSI 120 and a user. In some other embodiments, the connection manager module 122 may restrict access to the CBRSI 120 to only authenticated users and it may also handle the authentication of users or recording professionals via passwords, tokens, or any other authentication means known by one skilled in the art to be suitable for this purpose.

The connection manager module 122 may, in some embodiments, store a user profile configured to associate the user with one or more credentials that may be used to authenticate the user. In some other embodiments, the one or more credentials may include usernames, hashed passwords, geo-IP locations, or any other data as would be known to one skilled in the art to be useful as information that can be used to authenticate a user.

II. Cloud Computing Module

Also seen in FIG. 1, the CBRSI 120 of the present disclosure may, in some embodiments, include a cloud computing module 124. The cloud computing module 124 may, in some embodiments, be configured to instantiate virtual machine instances (VMs) and provision computing resources to the VMs based on user need. One or more of the virtual machine instances may, in some embodiments, be associated with a user and a VM associated with the user may be instantiated after the user is authenticated into the CBRSI 120. The VMs may, in some embodiments, be configured to operate as a music production environment, i.e., run one or more DAW programs that can be operated by a user.

In some other embodiments, the virtual machine instance associated with the user may have session data associated with the VM associated with the user saved and the session terminated when the user logs out of the CBRSI 120. The log-out process or termination of a VM session may also be referred to as a "termination event" hereinafter. The saving of session data may, in still other embodiments, allow the cloud computing module 124 to provide a user with the option to continue work on any previously saved projects within the VM by re-instantiating the VM associated with the user based on the previously saved session data.

In some embodiments, the provisioning of computing resources may be performed by the cloud computing module 124 dynamically, i.e., adjusted according to one or more performance-related parameters of the virtual machine instance during a session. As a non-limiting example, when a user is authenticated into the CBRSI 120, the cloud computing module 124 may instantiate a VM instance running a pre-configured installation of one or more professional-level DAW programs and other audio-related programs. The cloud computing module 124 may then dynamically provision computing resources, such as memory 144 and clock cycles on the processing unit 140 or the GPUs 142, to the VM instance based on anticipated need. In some embodiments, the cloud computing module 124 may increase or decrease the computing resources provisioned to the VM based on current use and overall demand on the CBRSI 120 system. In some other embodiments, the cloud computing module 124 may be configured to dynamically provision computing resources to the VMs according to a file-size parameter and a file-number parameter being operated on within the music production environment to maintain an expected-response-time parameter for the music production environment at or below a predetermined threshold value. As a non-limiting example, the expected computing resource demand for a VM instance associated with a user may be, in some embodiments, based in part on the number of files associated with the VM instances associated with the user (i.e., a file-number parameter) and the total size of the files associated with the user (i.e., a file-size parameter). These parameters may, in some embodiments, be used cloud computing module 124 to estimate an expected-response-time parameter for a typical/standard operation as may be performed by the user within the VM instance using a pre-set provisioning of computing resources, and the amount of computing resources may then be adjusted by the cloud computing module 124 if the expected-response-time parameter exceeds a predetermined threshold value. The predetermined threshold value may range from the time it takes to run a few clock cycles on the CBRSI 120 to a few seconds. In some embodiments, the predetermined threshold value may be set by a system administrator. In some other embodiments, the predetermined threshold value may be set according to the overall demand on the CBRSI 120 as measured by the cloud computing module 124.

As will be appreciated by one skilled in the art, the weighting of the various parameters described herein may be adjusted to meet different use cases and system needs, and any suitable weighting or algorithm for adjusting the weighting of these parameters as would be known to one skilled in the art are within the scope of the present disclosure.

As will also be appreciated by one skilled in the art, the VMs instantiated by the cloud computing module 124 may be accessed via a user interface on a remotely connected electronic device 160, such as a computer, laptop, or smart phone. This functionality allows for a user to access their own audio recordings running on professional-level DAWs that have access to sufficient computing resources to ensure responsive and proper functionality from home or anywhere with a sufficient network 150 connection on any suitable electronic device. Any suitable network 150 may be used within the scope of the present disclosure, including wired networks, wireless networks, and any other network as would be known to one skilled in the art to be suitable for connecting a user's remote electronic device 160 to a host server network 110. Moreover, the user may also grant access to other authenticated users, such as recording professionals, who can then remotely access and edit/mix the user's recording from nearly anywhere.

III. Cloud Storage Module

As seen in FIG. 1, in some embodiments, the cloud computing module 124 may be configured to communicate with a cloud storage module 130. The cloud storage module 130 may, in some embodiments, provide remote storage and access to audio recordings/files uploaded by a user from his or her at-home recording studio, and store any necessary data from a user session (i.e., session data) on a VM instantiated by the cloud computing module 124 to allow a user to pick up a prior session on a newly instantiated VM at a later time. As will be appreciated by one skilled in the art, any suitable method for securely connecting the cloud storage module 130, and its associated cloud storage space, i.e., the cloud storage SSDs 132, with the other component modules of the CBRSI 120 may be used within the scope of the present disclosure. In some embodiments, the cloud storage module 124 and the cloud-computing module 130 may be configured to prevent the downloading of files uploaded to or operated on within the CBRSI 120 outside of a protected download link. In these embodiments, the user may grant access to another person, such as a recording professional, that may access the VM running the DAW and manipulate the user's audio recordings therein but be restricted from exporting the audio files out of the CBRSI 120 system. This may help to maintain security over valuable recordings that a user may wish to restrict access to or keep private until a scheduled release.

Figure 2:
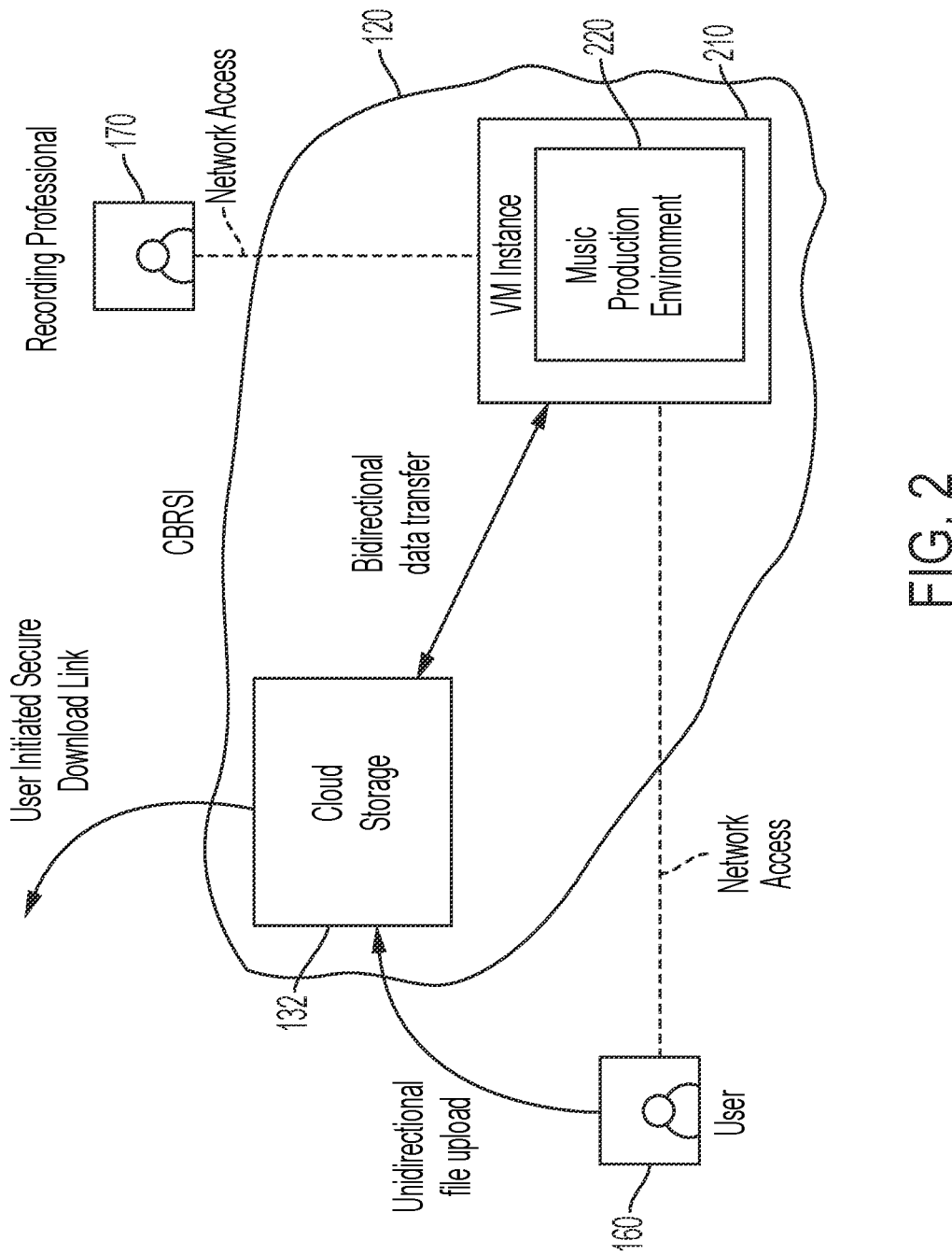
FIG. 2 is a diagram depicting data transfers into, within, and out of the cloud-based recording studio infrastructure, according to aspects of embodiments of the present disclosure.

Further understanding of the operation of the cloud storage module 130 may be seen in FIG. 2.

FIG. 2 is a diagram depicting data transfers into, within, and out from the CBRSI 120, according to aspects of embodiments of the present disclosure. As shown, in some embodiments, a user device 160 may perform a unidirectional file upload to the CBRSI 120 that may be stored in the cloud storage 132. The user device 160 may upload any type of file to the cloud storage 132. As a non-limiting example, the uploaded file may be a session file including one or more audio samples or recordings as compiled by a DAW on the user device 160. In some other embodiments, the uploaded file may be an audio file stored in any suitable format, including but not limited to, WAV, MP3, FLAC, or any other format as would be known to one skilled in the art. In still other embodiments, the user device 160 may record an audio sample to use within the uploaded file using a microphone 164. In some other embodiments, a user may also screen or otherwise listen to a recorded audio sample on the user device 160 using a connected headphone 162. In some embodiments, the microphone 164 and headphone 162 may be components received by the user in a pre-configured kit.

After a file has been uploaded into the cloud storage 132, bidirectional data transfers between the cloud storage 132 and the music production environment 220 of a virtual machine 210 may, in some embodiments, be made to facilitate access to and modification/mixing of recorded audio by a user or a recording professional on a recording professional device 170. In some embodiments, the CBRSI 120 may be configured to only allow access to the uploaded file within the cloud storage 132 via the music production environment 220 of the virtual machine 210 within the CBRSI 120 which can be access via a network by the user and/or the recording professional.

To help increase security and prevent unauthorized access/copying of unreleased audio projects, in some embodiments, the cloud storage 132 may be configured within the CBRSI 120 to only allow the exportation of a file via a user initiated secure download link. In such embodiments, the user that originally uploaded the file may control access to the unfinished audio files and the export of finished files out of the CBRSI 120 by restricting access to the credentials for initiating the creation of a secure download link. As described above, in regard to authentication into the CBRSI 120, any suitable authentication method as would be known to one skilled in the art may be used to prevent unauthorized initiation of secure download links.

IV. Collaboration Module

Turning back to FIG. 1, the functionality of the CBRSI 120 to facilitate new creative workflows for both at-home musicians and recording professionals may, in some embodiments, be further enhanced by the inclusion of a collaboration module 126. The collaboration module 126 may, in some embodiments, provide screen sharing tools and audio-conferencing tools for a user and one or more connected parties, such as a recording professional. The ability to maintain a simultaneous or concurrent multi-person connection to a user session on a VM instantiated by the cloud computing module 124 may, in some embodiments, allow for the near real-time recording and mixing of an audio file by a user and a recording professional while the user and the recording professional are accessing the CBRSI 120 from remote locations. This is functionality that has never previously been possible for a recording studio using currently offered recording hardware and software.

Moreover, the inclusion of screen share tools, such as a recording function, and real-time audio conferencing may allow for the CBRSI 120, in some embodiments, to be used as an educational tool. A user may, in some embodiments, use a shared access to a user session on a VM to obtain a lesson or demonstration from a connected recording professional in real time. Furthermore, in some other embodiments, the near real-time simultaneous or concurrent connection may allow for interactive lessons to be provided by the recording professional to one or more users. This may allow a user to actively use the software products instantiated within the VM while obtaining immediate direction and feedback from the recording professional. Again, this is a feature that is not possible using currently available recording studio technologies/equipment, and it is an opportunity for aspiring musicians and producers to obtain professional instruction on professional-level DAWs that would otherwise require in-person instruction at a recording studio.

In some embodiments, the screen share tools may include, but are not limited to, screen capture functionality, a recorder, a transcriber for providing captioned dialogue, and a translator.

In some embodiments, the audio-conferencing tools may include, but are not limited to, VOIP functionality.

Figure 3:
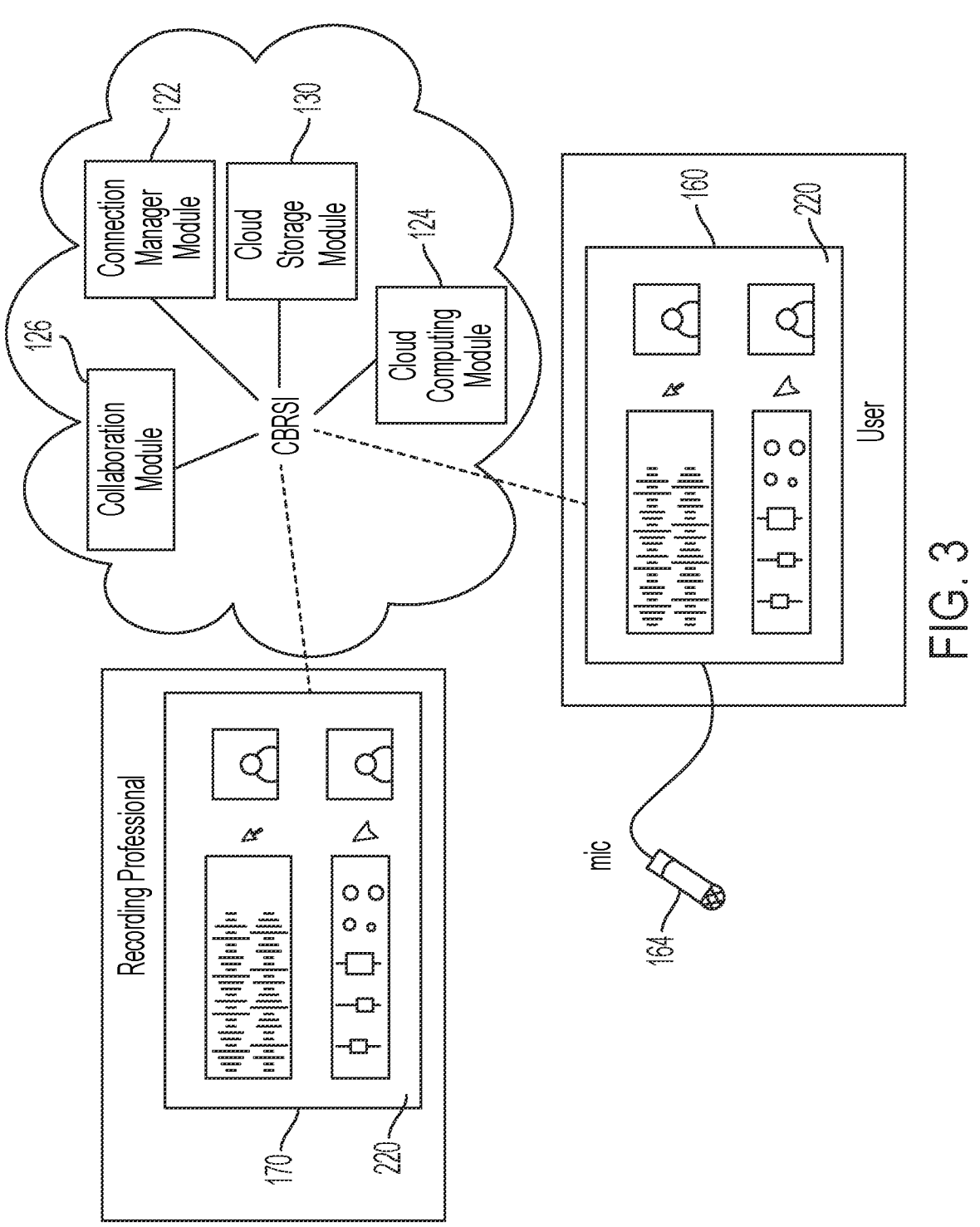
FIG. 3 is a diagram depicting the simultaneous access to a music production environment being instantiated by a cloud-based recording studio infrastructure, according to aspects of embodiments of the present disclosure.

Further understanding of the functionality of the collaboration module 126 can be had by reference to FIG. 3. FIG. 3 is a diagram depicting the simultaneous or concurrent access by a user device 160 and a recording professional device 170 to a music production environment 220 being instantiated by the component modules of the CBRSI 120.

As shown, from the perspective of the user device 160 and the recording professional device 170, the simultaneous or concurrent shared access to the music production environment 220 may, in some embodiments, be facilitated by the combination of one or more of the connection manager module 122, the cloud storage module 130, the cloud computing module 124, and the collaboration module 126.

In some embodiments, an audio recording may be recorded on the user device 160 using a microphone 164. The recorded audio file may then, in some other embodiments, be uploaded to the CBRSI 120 and then accessed and mixed/edited within the music production environment by the user and/or a recording professional. In still other embodiments, the collaboration module 126 may allow for the user and a recording professional to speak to each other in near real-time and discuss the mixing/editing of the recorded audio file while remotely accessing the CBRSI 120.

V. Tokenization Module

In some embodiments, the CBRSI 120 may include a tokenization module 134. The tokenization module 134 may, in some embodiments, be configured to associate a user-associated file with a unique digital identifier stored in a record on a blockchain. As will be appreciated by one skilled in the art, there are a large variety of blockchain implementations and/or token standards that are available for the "tokenization" of a digital file, and the specific blockchain implementation and token/standards may offer tradeoffs in transaction cost, popularity, response time, etc. Any suitable blockchain implementation and/or tokenization standard as would be known to one skilled in the art to be suitable for this purpose is within the scope of the present disclosure. In some embodiments, the tokenization module 134 may be used to tokenize and monitor usage of a tokenized file associated with a user as a form of intellectual property rights management. In some other embodiments, the tokenization module 134 may be configured to connect to a blockchain implementation designed to record attributions for use by third parties of a tokenized file associated with a user.

At-Home Recording Hardware Integrated into the Cloud-Based Recording Studio Infrastructure The benefits of some embodiments of the present disclosure may be more readily understood in the context of a user workflow while using a pre-configured Kit integrated with the CBRSI 120. Further understanding of a workflow, i.e., method, for creating an at-home recording studio integrated into the cloud-based recording studio infrastructure of the present disclosure can be had by reference to FIG. 4.

FIG. 4 is a flowchart describing a method for the creation of a home-based remote recording studio 400, according to aspects of embodiments of the present disclosure. As shown in the flowchart, in some embodiments, the method may begin at step 410 with performing of an assessment of one or more recording needs of a user. The one or more recording needs of the user may include, but are not limited to, recording vocals, recording live instrumentation, recording live audio in a variable or non-isolated environment, budget and cost management needs, connectivity with mobile or other electronic devices, and any other consideration that would be known to one skilled in the art to be relevant to the planning and creation of an at-home recording studio. In some embodiments, the assessment of step 410 may be performed by a remote recording professional working with the user. In some other embodiments, the user may perform the assessment of step 410 individually or with the assistance of a questionnaire.

After the assessment, the method may, in some embodiments, proceed to step 420, the preparing, based on the assessment of the one or more recording needs of the user, a home recording kit including recording hardware. As described above, the recording kit hardware may, in some embodiments, include a microphone and a headphone. Any suitable microphone as would be known to one skilled in the art for the digital recording of live audio may be used within the scope of the present disclosure. Likewise, any headphone known to be suitable for monitoring or otherwise accurately reproducing recorded audio may be used within the scope of the present disclosure.

In some embodiments, the preparation of the recording kit and its associated hardware may be performed by a recording professional in a remote location. In some other embodiments, the kit may be assembled by the user.

Following the preparation of the recording kit at step 420, the kit may, in some embodiments be sent to the user at step 430. Any suitable method for sending the recording kit to the user may be used within the scope of the present disclosure.

Once the recording kit has been sent to the user at step 430, the method may then proceed, at step 440, to providing the user with access credentials associated with a user profile stored in the cloud-based recording studio infrastructure. As described above, the user credentials associated with the user may include any type of credential or authenticating information as would be known by one skilled in the art to be suitable for the purpose of authenticating a user into a software program.

After the user has been authenticated into the cloud-based recording studio infrastructure using the credentials provided in step 440, the method may, in some embodiments, proceed to step 450, connecting, via a shared session on a virtual machine instance instantiated by a cloud-based recording studio infrastructure, with the user to establish a near real-time shared access to an uploaded file recorded by the user via the home recording kit.

As will be appreciated by one skilled in the art, the quality of a live audio recording may depend heavily on the placement and setup of the microphone and the isolation from background noise and distortion of the microphone during recording. It may take a significant amount of effort or trial-and-error for inexperienced music producers to properly configure an at-home recording studio to produce quality live audio recordings. As such, in some embodiments, the method may proceed after step 450 to step 460, instructing, via the shared session on the virtual machine instance, the user to adjust one or more setup parameters of the home recording kit based upon one or more recording parameters of the uploaded file recorded by the user via the home recording kit. In some of these embodiments, the instructing may be performed by a recording professional at a remote location that is accessing a shared music production environment instantiated within a VM running in the cloud-based recording studio infrastructure described above.

In some other embodiments, the first step for creating a cloud-based at-home recording studio may be an evaluation of the user's available computing resources and/or recording equipment. If the user has access to a computing device suitable for connection to the Kit hardware and the CBRSI 120, then the user may be sent a Kit. As described above, in some embodiments, the component parts of the Kit may be selected based upon user need. In some other embodiments, a standardized Kit may be sent to all users.

Likewise, in some embodiments, once the user has installed the recording hardware in their at-home recording space, which may be any suitable place for recording, the user may access a pre-installed or freely available DAW on their computing device and use the Kit's USB microphone to begin recording audio into a project file. As will be appreciated by one skilled in the art, the process here will largely be determined by the DAW the user has access to, but for the purposes of the present disclosure the important aspect of this process is the capture of an audio recording in a suitable file type on the user's computing device. As will also be appreciated by one skilled in the art, any suitable file format and/or bitrate may be used for the audio recordings within the scope of the present disclosure.

As described previously, during the method 400, in some embodiments, the user may proceed to upload their recorded audio file to the CBRSI 120. In some of these embodiments, this may prompt the user to authenticate into the CBRSI 120 via the connection manager module 122 as described above. In some other embodiments, this authentication may be handled automatically after a user has previously established a connection to the CBRSI 120. Once connected, the user may upload their recorded audio file to be stored in the CBRSI's cloud storage via the cloud storage module 130. The user may then, in some embodiments, access the recorded audio file using a VM on the CBRSI 120 at any time using any suitable networked device.

When a user, or an authorized production expert, wants to edit/mix the user's uploaded audio recordings, a connection the CBRSI 120 may be created, in some embodiments, by the connection manager module 122 after receipt of an access request. If the user or authorized production expert is authenticated and connected, the cloud computing module 124 may, in some embodiments, instantiate a production environment on a VM instance running within the CBRSI 120 and dynamically provision computing resources to the VM instance. The VM instance may, in some embodiments, then be connected to the user's recorded audio files stored within the CBRSI 120 cloud storage via the cloud storage module 130.

At this time, the user may then access the production environment of the VM instance associated with the user to use one or more professional-level DAWs to edit/mix their audio recordings. During the user's session on the VM instance associated with the user, the user's work may be saved to the cloud storage module 130 to facilitate future work in a later session.

Moreover, if there is a need for another person to access the VM instance associated with the user, such as an authorized production expert, the user may, in some embodiments, authorize the connection manager module 122 to grant access to them. In such embodiments, a variety of new workflow possibilities may be possible. As a non-limiting example, a user may have a production expert remotely access the VM instance associated with the user and have them edit/mix/master the user's recordings. This may create a new way for music industry experts to interact and work with aspiring musicians, and it may reduce costs for both the user and the production experts by eliminating travel costs and other overhead associated with using a traditional recording studio. Moreover, simultaneous or concurrent access to the VM instance associated with the user may, in some embodiments, be enabled to allow a user to see and hear the production expert working on their audio recordings in almost real-time while accessing the VM instance associated with the user from nearly any networked device at any suitably networked location. Simultaneous or concurrent access may, in some other embodiments, also facilitate training or other educational features by allowing a user to see and receive instruction from a production expert while the production expert works on the user's audio recordings.

After a session on a VM instance associated with a user is completed, in some embodiments, the work of a user or authorized production expert may be saved to the cloud storage of the CBRSI 120 as session data and the VM instance terminated to free up computational resources for other users. If the user wishes to pick up where he or she left off, the saved session data can be accessed in a subsequent VM session, and the process repeated.

Once a user has a finished audio recording, in some embodiments, the user may authorize the export of the audio file from the CBRSI 120 using a protected download link. In some embodiments, the protected download link may be the only way to export audio files from a VM instance on the CBRSI 120 to an external device. In these embodiments, this may help to prevent unauthorized dissemination of unreleased audio file before authorization from a user. After the successful export of audio from the CBRSI 120, the file may be transported or communicated using any standard means or uploaded into a distribution system.

Thus, as described above, aspects of embodiments of the present disclosure may be directed to a new architecture for a recording studio using a hybrid at-home/remote mode of operation that leverages distributed (cloud) computing resources to produce music production workflows that improve the functionality of the recording and music production tools generally available to consumers. Likewise, according to some embodiments of the present disclosure, the particular structure of the CBRSI 120 may allow for new ways for music producers to collaborate in near real-time on projects in a way that prevents unauthorized dissemination of unfinished recordings.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

GL/ae

What is claimed is:

1. A cloud-based recording studio infrastructure, comprising:

A host server network comprising a processing unit, a memory, and a storage unit, the storage unit being configured to store and execute a set of instructions configured to, when executed by the processing unit of the host server network, cause the host server network to instantiate a remote recording studio system comprising:

a cloud computing module configured to instantiate a virtual machine instance associated with a user and dynamically provision computing resources to the virtual machine instance associated with the user, the virtual machine instance associated with the user being configured as a music production environment configured to be simultaneously accessed by the user and one or more secondary users;

a cloud storage module configured to manage a cloud storage network, store an uploaded file from the user to the cloud storage network, and restrict access to one or more resources stored on the cloud storage network to the virtual machine instance associated with the user; and a connection manager module configured to authenticate the user and the one or more secondary users and manage access to the virtual machine instance associated with the user.

2. The cloud-based recording studio infrastructure of claim 1, wherein the at least one of the one or more secondary users is a recording professional and the connection manager module is further configured to authenticate the recording professional and manage access by the recording professional to the virtual machine instance associated with the user.

3. The cloud-based recording studio infrastructure of claim 2, wherein the connection manager module is further configured to manage simultaneous access by the user and at least one of the one or more secondary users to the virtual machine instance associated with the user.

4. The cloud-based recording studio infrastructure of claim 3, wherein the remote recording studio system further comprises:

a collaboration module configured to provide a near real-time audio connection between the user and at least one of the one or more secondary users alongside the simultaneous access by the user and at least one of the one or more secondary users to the virtual machine instance associated with the user.

5. The cloud-based recording studio infrastructure of claim 1, wherein the cloud storage module is further configured to associate an uploaded file from the user with the user and restrict further access to the uploaded file from the user to only the virtual machine instance associated with the user.

6. The cloud-based recording studio infrastructure of claim 1, wherein the processing unit of the host server network comprises:

a plurality of multi-core graphics processing units (GPUs) configured to operate in parallel to carry out the operations of the cloud-based recording studio infrastructure.

7. The cloud-based recording studio infrastructure of claim 1, wherein the music production environment is configured to run one or more digital audio workstations (DAWs).

8. The cloud-based recording studio infrastructure of claim 7, wherein the music production environment is further configured to run one or more video editing programs alongside the one or more DAWs.

9. The cloud-based recording studio infrastructure of claim 1, wherein the cloud computing module is configured to dynamically provision computing resources to the virtual machine instance associated with the user according to a file-size parameter and a file-number parameter being operated on within the music production environment to maintain an expected-response-time parameter for the music production environment at or below a predetermined threshold value.

10. The cloud-based recording studio infrastructure of claim 1, wherein the remote recording studio system further comprises a tokenization module configured to associate a user-associated file with a unique digital identifier stored in a record on a blockchain.

11. A cloud-based music production system, comprising:

a first remote computing device configured with an audio capture program;

a microphone configured to communicatively connect to the first remote computing device;

a cloud storage network configured to be accessible to the first remote computing device;

a cloud-based recording studio infrastructure configured to instantiate a virtual machine instance associated with a user running a digital audio workstation and further configured to allow simultaneous remote access to the virtual machine instance to the first remote computing device and a second remote computing device.

12. The cloud-based music production system of claim 11, wherein the cloud-based recording studio infrastructure is further configured to store one or more session files recording a state of the virtual machine instance to the cloud storage network automatically upon a termination event of the virtual machine instance.

13. The cloud-based music production system of claim 12, wherein the cloud-based recording studio infrastructure is further configured to load the one or more session files from the cloud storage network and instantiate the virtual machine instance at the previously recorded state of the virtual machine instance.

14. The cloud-based music production system of claim 11, wherein the second remote computing device is associated with a second user and is configured to remotely access the virtual machine instance associated with the first user.

15. The cloud-based music production system of claim 11, further comprising:

a headphone configured to communicatively connect to the first remote computing device.

16. The cloud-based music production system of claim 11, wherein the cloud-based recording studio infrastructure is further configured to dynamically provision one or more cloud resources to the virtual machine instance and record a resource usage metric for the virtual machine instance to the cloud storage network.

\* \* \* \* \*